United States Patent
Donovan et al.

(10) Patent No.: US 7,302,399 B1
(45) Date of Patent: Nov. 27, 2007

(54) METHOD AND SYSTEM FOR PROCESSING TRAVEL RESERVATION DATA

(75) Inventors: William J. Donovan, Miami, FL (US); Joseph P. Zamzow, Miami, FL (US)

(73) Assignee: Electronic Data Systems Corporation, Plano, TX (US)

( * ) Notice: Subject to any disclaimer, the term of this patent is extended or adjusted under 35 U.S.C. 154(b) by 759 days.

(21) Appl. No.: 09/437,278

(22) Filed: Nov. 10, 1999

(51) Int. Cl.
*G06Q 10/00* (2006.01)
*G06F 17/30* (2006.01)
*G06F 7/00* (2006.01)

(52) U.S. Cl. .............................. 705/5; 705/400; 707/3; 707/203

(58) Field of Classification Search .................. 705/5, 705/6; 707/1, 102, 203
See application file for complete search history.

(56) References Cited

U.S. PATENT DOCUMENTS

| | | | |
|---|---|---|---|
| 4,546,432 A * | 10/1985 | Umemura et al. | 712/42 |
| 5,253,166 A * | 10/1993 | Dettelbach et al. | 705/5 |
| 5,331,546 A * | 7/1994 | Webber et al. | 705/6 |
| 5,628,007 A * | 5/1997 | Nevarez | 707/102 |
| 5,644,721 A * | 7/1997 | Chung et al. | 705/5 |
| 5,664,109 A * | 9/1997 | Johnson et al. | 705/2 |
| 5,764,972 A * | 6/1998 | Crouse et al. | 707/1 |
| 5,842,176 A * | 11/1998 | Hunt et al. | 705/5 |
| 5,966,704 A * | 10/1999 | Furegati et al. | 707/3 |
| 6,023,679 A * | 2/2000 | Acebo et al. | 705/5 |
| 6,125,371 A * | 9/2000 | Bohannon et al. | 707/203 |
| 6,189,016 B1 * | 2/2001 | Cabrera et al. | 707/203 |
| 6,212,512 B1 * | 4/2001 | Barney et al. | 707/1 |
| 6,377,932 B1 * | 4/2002 | DeMarcken | 705/5 |

FOREIGN PATENT DOCUMENTS

| | | | |
|---|---|---|---|
| JP | 63109530 A * | 5/1988 |
| JP | 03001290 A * | 1/1991 |
| JP | 03051987 A * | 3/1991 |

OTHER PUBLICATIONS

Fairlie, Rik, "Continental, EDS Agree on Deal", Sep. 17, 1990, Travel Weekly, vol. 49 No. 75, 2 pages.*
Corzo, Cynthia, "Widely Used Amadeus Reservation System Keeps Travelers Connected", Dec. 17, 1998, Knight-Ridder Tribune Business News, 2 pages.*

* cited by examiner

*Primary Examiner*—Jeffrey A. Smith
*Assistant Examiner*—Rachel Porter
(74) *Attorney, Agent, or Firm*—Baker Botts L.L.P.

(57) ABSTRACT

One aspect of the invention is a travel pricing system comprising a data store and a server coupled to the data store. The server is operable to receive new reservation data that conflicts with old reservation data in the data store. The new reservation data comprises a plurality of new attributes. The reservation data in the data store comprises a format and a plurality of old attributes. The server is further operable to associate the new reservation data with a time stamp, and add the new reservation data and time stamp to the data store without modifying the old attributes.

21 Claims, 5 Drawing Sheets

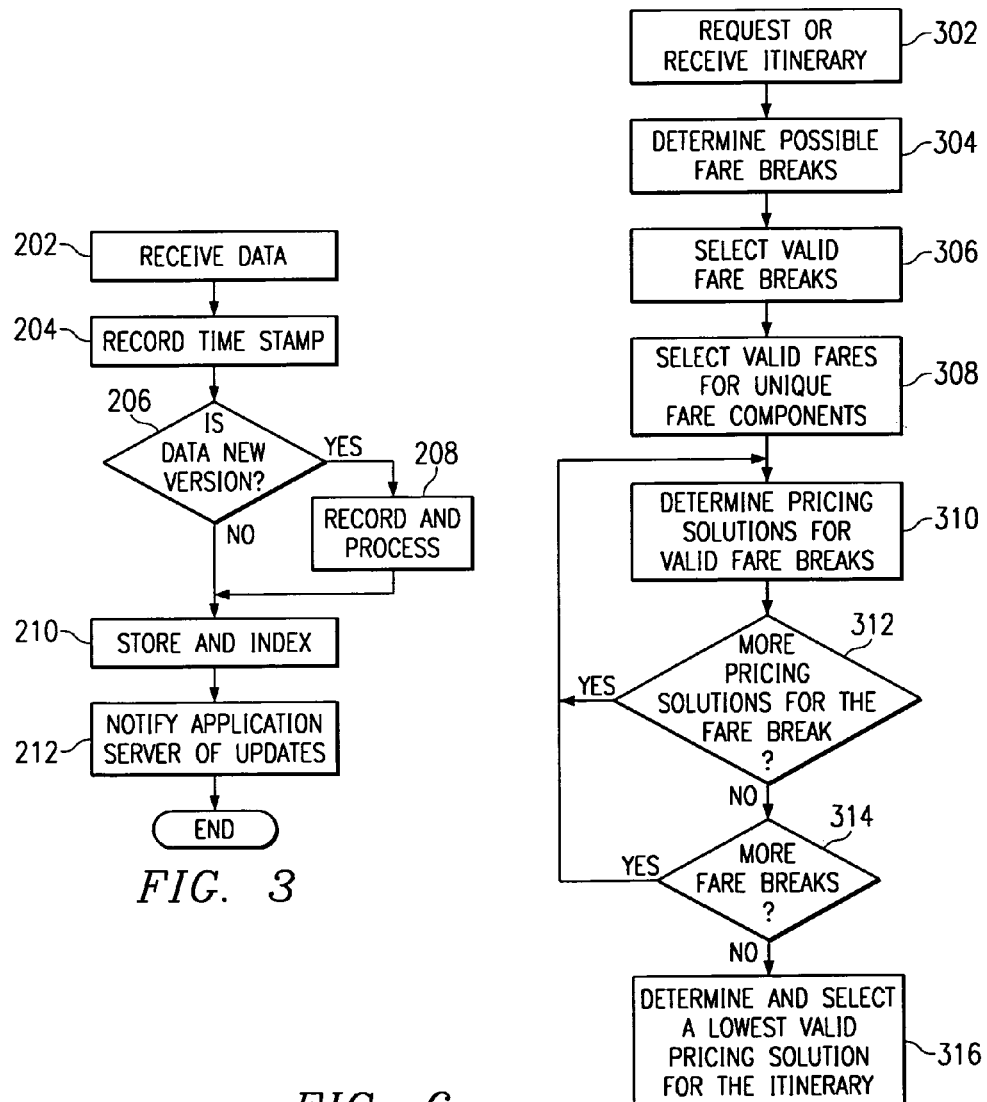
FIG. 3
FIG. 4
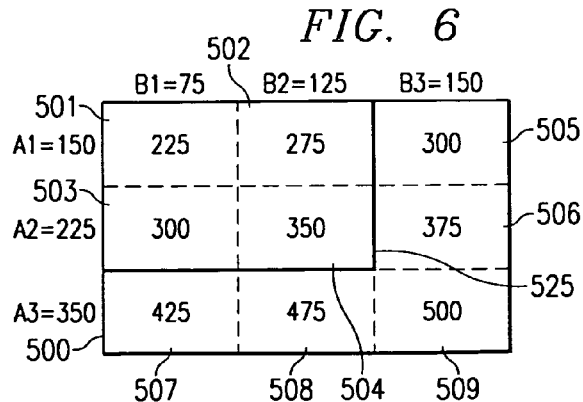
FIG. 6

US 7,302,399 B1

METHOD AND SYSTEM FOR PROCESSING TRAVEL RESERVATION DATA

RELATED APPLICATION

This patent application is related to co-pending U.S. application Ser. No. 09/438,025 filed Nov. 10, 1999, and entitled SYSTEM AND METHOD FOR FINDING THE LOWEST OR HIGHEST VALUED VALID COMBINATION OF PARTICULAR OPTIONS.

TECHNICAL FIELD OF THE INVENTION

This invention relates generally to information processing and more particularly to a travel pricing system and method.

BACKGROUND OF THE INVENTION

Many industries, such as the travel industry, rely on information that is time-sensitive and subject to continuous change. Information management systems may be used to process a large number of client requests involving this time-sensitive information.

Conventional information management systems used in the travel industry typically update their information on a batch basis, at large time intervals such as daily or weekly. The frequency of available updates may limit system accuracy and/or may interfere with the ability of service providers to quickly change their pricing and scheduling. Conventional systems may also convert information formats as they are received to a common format for database storage, further delaying the availability of the updated information for processing. This process can be time consuming and consume substantial computer resources. Delays in distributed information management systems may further hinder efficient synchronization of the information updates across the entire system.

After updating the information, these traditional systems may process information by utilizing complex algorithms to locate, validate, and select accurate information. In many cases, these algorithms may utilize significant computer resources. These prior systems and methods may not process information quickly enough to keep up with the frequency of updates to the information. Accordingly, a need has arisen for a travel pricing method and system that effectively processes time-sensitive information.

SUMMARY OF THE INVENTION

One aspect of the invention is a travel pricing system comprising a data store and a server coupled to the data store. The server is operable to receive new reservation data that conflicts with old reservation data in the data store. The new reservation data comprises a plurality of new attributes. The reservation data in the data store comprises a format and a plurality of old attributes. The server is further operable to associate the new reservation data with a time stamp, and add the new reservation data and time stamp to the data store without modifying the old attributes.

The invention provides several important advantages. Various embodiments of the invention may have none, some, or all of the following advantages. The invention may be utilized in a variety of applications including those that use time-sensitive information. The invention may reduce the time needed to process information updates, and consequently, may ensure accurate processing that reflects the updates and facilitate more frequent updating of information. The invention may process information in any format received or can convert to a common format. The invention may also enable timely synchronization of information updates across a variety of computer platforms or systems.

BRIEF DESCRIPTION OF THE DRAWINGS

For a more complete understanding of the present invention and the advantages thereof, reference is now made to the following descriptions taken in conjunction with the accompanying drawings in which:

FIG. 3 illustrates a flow chart of an example of a method for storing time-sensitive information utilizing the teachings of the present invention;

FIG. 4 illustrates an example of a flowchart describing a method for a processing a client itinerary utilizing the teachings of the present invention;

FIG. 6 illustrates graphically the selection of a valid combination of values from a plurality of lists that minimizes or maximizes a mathematical operation of the combination utilizing the teachings of the present invention;

DETAILED DESCRIPTION OF THE DRAWINGS

The present invention and its advantages are best understood by referring to FIGS. 1 through 8 of the drawings, like numerals being used for like and corresponding parts of the various drawings.

Figure 1:
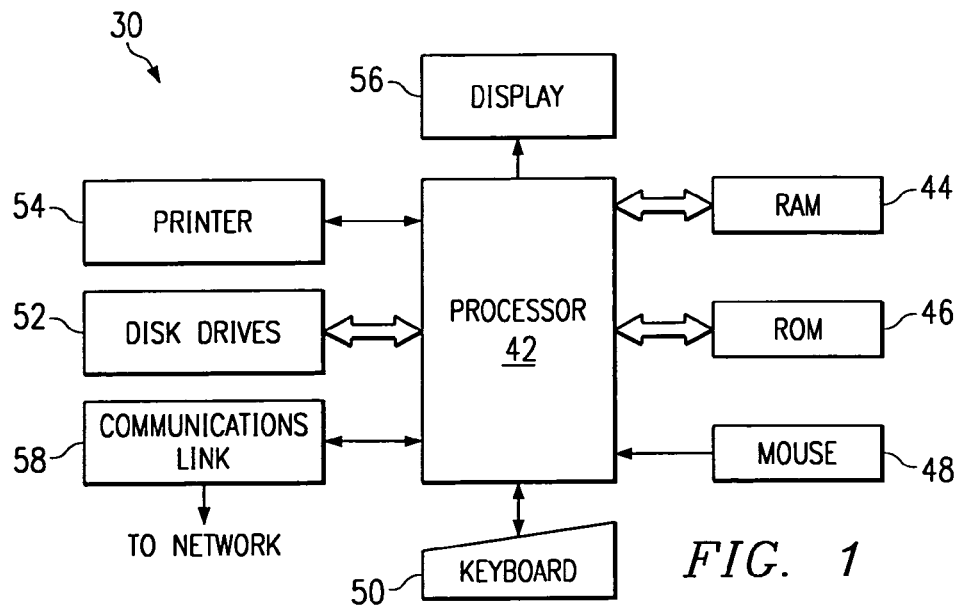
FIG. 1 illustrates an exemplary general purpose computer that may be used to implement the present invention.

FIG. 1 illustrates a general purpose computer 30 that may be used for information management in accordance with the present invention. Specifically, general purpose computer 30 may comprise a portion of an information management system and may be used to execute applications comprising information management software, including software to store and process travel industry data. General purpose computer 30 may be adapted to execute any of the well known MS-DOS, PC-DOS, OS2, UNIX, MAC-OS and Windows operating systems or other operating system. General purpose computer 30 comprises processor 42, random access memory (RAM) 44, read only memory (ROM) 46, mouse 48, keyboard 50, and input/output devices such as printer 54, disk drives 52, display 56 and communications link 58. The present invention includes programs that may be stored in RAM 44, ROM 46, or disk drives 52 and may be executed by processor 42. Communications link 58 is connected to a computer network but could be connected to a telephone line, an antenna, a gateway, or any other type of communication link. Disk drive 52 may include a variety of types of storage media such as, for example, floppy disk drives, hard disk drives, CD ROM drives, or magnetic tape drives. Although this embodiment employs a plurality of disk drives 52, a single disk drive 52 could be used without departing from the scope of the invention. FIG. 1 only provides one example of a computer that may be used with the invention. The invention could be used with computers other than general purpose computers as well as general purpose computers without conventional operating systems.

Figure 2:
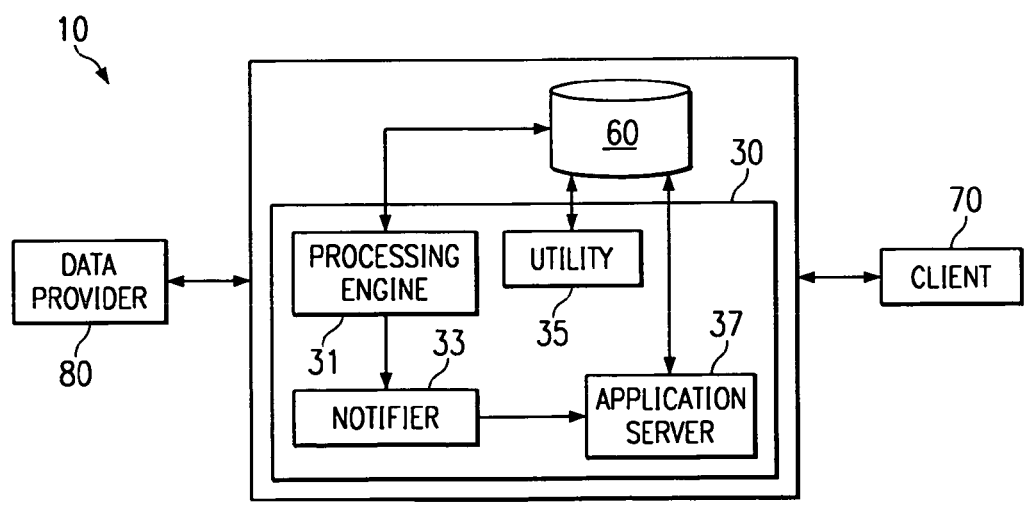
FIG. 2 illustrates an exemplary block diagram of a system utilizing the teachings of the present invention.

FIG. 2 illustrates a block diagram of one embodiment of an information management system 10 utilizing the teachings of the present invention. Information management system 10 comprises general purpose computer 30 coupled to storage medium 60 (which may be a part of computer 30). Information management system 10 may communicate and otherwise transmit and receive information that may be time-sensitive with one or more clients 70 and one or more data providers 80. Information management system 10 may utilize any suitable network protocol and/or logical or functional configuration to communicate with other external elements, computers 30, clients 70, and data providers 80. Information management system 10 may utilize a computer network or a telephone line, an antenna, a gateway, or any other type of communication link. As described below, information management system 10 may store time-sensitive information in a manner that may reduce delays in making available such information, and may also reduce subsequent processing time. Information management system 10 may also timely and accurately process and validate time-sensitive requests from clients 70 for a variety of applications. Some requests may involve validation according to desired criteria. For example, information management system 10 may be a travel pricing system that determines an up-to-date fare price that is validated against a set of criteria, such as the date of travel, for an itinerary requested by client 70.

In a variety of applications, information management system 10 may also determine a valid combination of values that minimizes or maximizes a mathematical result of the combination, such as a sum thereof. The information used typically varies between applications and/or industries, and may or may not be time-sensitive. For example, information management system 10 may be a travel pricing system that determines a lowest possible fare achievable for an itinerary requested using client 70. Information management system 10 may also be used for other applications, such as to determine the lowest cost for assembling a working product with a variety of parts.

Computer 30 may comprise one or more processing engines 31, notifiers 33, utilities 35 and application servers 37. Computer 30 may receive and transmit information from one or more internal or external data providers 80 in a variety of data formats and versions. Such information may be received from a data provider 80 from time to time, at predetermined intervals or upon request. Elements 31, 33, 35, and 37 may be configured in any logical or functional structure, and may comprise one or multiple processes, or parts of processes. Each of elements 31, 33, 35, and 37 may also reside on the same or separate computers 30. Depending upon the application, some or all of these elements could be omitted without departing from the scope of the invention.

If information management system 10 receives updates of information from outside sources, then processing engine 31 may receive updates to information from data provider 80 and processes the updates for storage in storage medium 60 for further use by information management system 10. Processing engine 31 may communicate with data provider 80 to request updates, or to inform data provider 80 that it is ready to receive updates. Processing engine 31 may transfer the updates into temporary storage, e.g. in storage medium 60, or to available random access memory (not explicitly shown), to verify accuracy or for safekeeping until processing is complete. Such processing may be performed as updates are received, or from time to time as updates are accumulated, according to the needs of information management system 10. As described in further detail in conjunction with FIG. 3, processing engine 31 may index and store the updates received for subsequent use by application server 37. If desired, the information received may be translated to a common format.

Notifier 33 is coupled to processing engine 31 and application server 37, and informs application server 37 of updates. Notifier 33 is discussed in further detail in conjunction with FIG. 3, and may use any suitable scheme, and may be used with a plurality of application servers 37 to ensure that each application server 37 is synchronized with the most up-to-date information stored in storage medium 60 if the information is changing and/or time-sensitive.

Storage medium 60 is accessible by computer 30, processing element 31 and application server 37, and stores updates received and processed by information management system 10. Storage medium 60 may comprise any suitable database, such as a relational database, an object database, or a hierarchical database. In one embodiment, storage medium 60 may comprise an SQL database management system. Alternatively, or in addition, storage medium 60 may also comprise flat files which may or may not be hierarchically organized into directories. Storage medium 60 may also comprise multiple databases or directories in a distributed object system that may reside on separate computers 30. Utility 35 may be coupled to storage medium 60 to perform suitable archiving and purging functions for storage medium 60 from time to time as required by information management system 10.

Application server 37 may simultaneously receive and process a plurality of application-specific requests from a plurality of internal or external clients 70. Information management system 10 may comprise a plurality of application servers 37 suitable for processing any number of requests or for automatically performing such processing. Each application server 37 may reside on an individual server (not explicitly shown). Each application server 37 may also access storage medium 60, and/or comprise its own storage medium (not explicitly shown) to store portions of frequently used or relevant information for expediting processing of these requests. In one embodiment of the invention, application server 37 may identify and locate relevant data necessary to service a client request. Application server 37 may validate data to ensure that it meets applicable criteria and determine a valid combination of multiple valid values that minimizes or maximizes the total sum of the combination. Processing client requests and updates is described in further detail in conjunction with FIGS. 4-8.

In one embodiment of the invention, information management system 10 may be used to store and process data used in the travel industry for flight, bus, train, hotel, rental car, tour or other reservations and/or fare processing for the same. Information management system 10 is operable to receive information on fares or other travel costs and maintain accurate historical records thereof. Such a travel price information management system 10 may thus provide pricing for any travel itinerary, including airline travel. Information management system 10 may also be operable to make reservations and/or to determine allowable refunds using historical records of pricing information.

In operation, data providers 80 may transfer to information management system 10 updates distributed and published by each service provider as to fares (or other pricing), rules and restrictions. Each update comprises one or more attributes. For example, in the travel industry, an update may comprise a fare record that includes attributes such as a fare class, a fare price, and an effective date. Information management system 10 may receive and process the updates as they become available from data provider 80, or in batch form. Information management system 10 may process requests for each client 70 using up-to-date information: Such processing may involve complex calculations that take into account applicable criteria, such as the validity of fares for a particular date or applicable rules. One process that may be used to store updates to travel pricing data is described in conjunction with FIG. 3. That process may enable information management system 10 to reduce the elapsed time between such updates and the availability to client 70 of the updated information.

In the travel industry, updates generally comprise reservation data. Reservation data may include, but is not limited to, information related to and/or necessary to make and/or price reservations for an itinerary. For example, reservation data may include information related to and/or necessary to display or quote billing, cost, or pricing data associated with acquiring or reserving a ticket, to check on the availability of reservations and/or to issue a ticket. Reservation data may also include, but is not limited to, fare records, rules, restrictions, schedules, etc. Each fare record may be associated with a service provider's price for a fare class, such as first class, between a pair of locations. For example, an airline carrier may publish prices for many fare classes between a city pair comprising an origin and destination such as Los Angeles (LAX) and Miami (MIA). Fare records typically delineate the fare class code and an effective fare date that indicates when the fare becomes valid. Fare records may also include other effective dates, such as when the fare may be discontinued, and so on. Fare records may also include identifiers to one or more applicable rules, restrictions, tariffs, and so on. Information management system 10 may maintain historically accurate records for such fare data in an efficient manner that reduce the amount of storage space and/or computing resources to process updates to the data. Updated fare records typically comprise new attributes such as effective dates, prices, or applicable rules, that may conflict with older attributes of fare records already in storage medium 60.

Each fare is generally associated with restrictions and/or rules imposed by the service provider. For example, fare component-based rules may relate to fare and itinerary information, and may restrict days of the week or year when travel is permitted. Priceable unit-based rules may be evaluated in the context of other fares, and include the combinability of inexpensive excursion fares with certain other fares or minimum stays. Similarly, passenger-based rules are typically evaluated based on fares chosen for accompanying passengers, including whether accompanying travel is free, such as with a companion ticket.

Routing rules include carrier restrictions such as flight connections, stopovers or fare availability. Thus, an airline carrier may desirably route most passengers through its Houston hub between many city pairs. These fares, restrictions and rules may be stored in storage medium 60 by any suitable method, such as the one discussed in conjunction with FIG. 3, in separate data files, or in a database. Information management system 10 may desirably maintain historically accurate storage for such rules and restrictions, including updated rules and restrictions that conflict with rules and restrictions already in storage medium 60.

In addition to the complex manner in which reservation data may be distributed and updated by each carrier, each data provider 80 may utilize and transfer information in a unique format. For example, one data provider 80 may transfer "fare transactions" comprising a fare class code, link number, and a sequence number that identifies pertinent aspects of the record internal to data provider 80. Fare records may also include a version number that indicates a change such as a new data format or new record field that data provider 80 will subsequently use. Each change may be unique to each data provider 80, and each application. Information management system 10 may accommodate these changes to minimize disruptions in updating records of travel reservation data stored in storage medium 60. By capturing the updates with a version number, information management system 10 may monitor these changes while avoiding burdensome conversion thereof, and thus may reduce the time necessary to effectively store the updates. Information management system 10 may subsequently utilize different processing methods for each of these changes. For example, in one embodiment of the invention, an interpretive language such as Prolog may be used to dynamically execute appropriate software code to process a plurality of formats. Other implementations for processing multiple formats may also be used without departing from the scope of the invention.

FIG. 3 illustrates an exemplary method for storing time-sensitive information utilizing the teachings of the present invention. The method generally includes the steps of receiving information, processing a time stamp, processing new information updates and then indexing and storing the information for efficient access. Information management system 10 also notifies application server 37 of the new updates.

In step 202, processing engine 31 receives updates from data provider 80. Processing engine 31 may temporarily store the received updates in storage medium 60 to verify accuracy, or for safekeeping until processing engine 31 has completed processing at step 210. In this embodiment, each update may comprise a fare for travel between a city pair associated with a carrier. The fare typically comprises a fare class code, applicable rules and/or restrictions, and any effective dates. Other updates comprise rules and restrictions, each also typically associated with a carrier. Any other type of travel reservation data may also be included with an update.

At step 204, processing engine 31 optionally associates a time stamp with each update. In one embodiment of the invention, the time stamp may comprise an actual time stamp and an activation time stamp. An actual time stamp identifies when the information was received or generated by data provider 80. Processing engine 31 may generate its own time stamp, or utilize data within the received record, such as a data provider's issue time and date. The time stamp may be in any format and desirably includes both a date and time of receipt, to suit any time and/or date-sensitive, application-specific needs of information management system 10. In some embodiments, a time stamp may be omitted if not used in calculating a fare price.

Processing engine 31 may key the activation time stamp to an issue date. An activation time permits updates to different record types, such as fares and rules, to be simultaneously activated, and identifies when information management system 10 may validly use the information. In some embodiments of the invention, an activation time stamp desirably allows information management system 10 to subsequently coordinate processing and validation of various time-sensitive data. For example, because valid and accurate pricing may depend on both fare data and corresponding rule or restriction data, activation times for fare updates may be delayed until corresponding rules changes have been recorded. Thus, if information management system 10 receives fare updates at 8:00, but applicable rules are not received until 8:30, information management system 10 may move back the activation time stamp for the fare updates to 8:30. Similarly, information management system 10 may post-date any updates with a later activation time stamp to provide additional time to verify the integrity or accuracy of updates after they are received. Information management system 10 may also request that data provider 80 re-send any corrupted or inaccurate updates.

In step 206, processing engine 31 determines whether the update includes other changes, such as a change in format. If so, in step 208 processing engine 31 processes and associates a time stamp with the relevant changes required for application server 37 to subsequently process the data. In one embodiment of the invention, changes such as new data formatting specifications are associated with the time stamp by using a language such as Prolog. Prolog is a language that may dynamically execute instructions at run time, and thus may incorporate suitable changes to the code to accommodate changes as they occur. Thus, application server 37 may include multiple software processes, objects, methods, etc., each associated with a particular format of the data. The correct software to handle particular data may be handled at run time. This feature of the invention allows changes to be made in data formats and the way rules and restrictions are applied with reduced burden on the operator of information management system 10. Rather than changing the entire system to deal with many ever-changing formats each time a format changes, the invention allows a piece of software to be dynamically inserted at run time to handle the specific format. This feature may also reduce disruptions caused by changes to the system and simplify debugging. Application server 37 may then subsequently search for, access and otherwise process both data formats by using the time stamp to determine the required software.

In step 210, processing engine 31 then stores the data in storage medium 60. Some storage may also include indexing of the data. In some embodiments, the updated data may be converted to a common format and then stored. In other embodiments, the data may be stored directly. The invention allows storage without modifying existing data already stored in storage medium 60. Modifications could be made without departing from the scope of the invention. In one embodiment of the invention, processing engine 31 may receive, time stamp and then append each fare record comprising an update to an applicable flat file in storage medium 60. When using the stored data at a later time, information management system 10 may locate each fare record chronologically by its associated time stamp, by searching backward from the end of the file until the proper record is located. Because existing data in the file can remain unmodified, processing engine 31 may desirably eliminate any processing time needed to perform such modification, or to search through or process such modified information. Existing systems use significant resources on such tasks. Other methods for storing and indexing the new information may also be used. For example, chronological time stamp keys may be used in a variety of database schemes to store updates as new database records.

Information management system 10 may thus maintain a historical record of fare data as a plurality of fare records ordered using associated time and/or date information such as a time stamp. For example, a travel reservation file may be indexed by carrier-city pair. Such a file may contain a first fare record and subsequent fare increases, decreases, cancellations, discontinuations, or special extensions, each with an effective date and an applicable fare class code. Information management system 10 can then use both the time stamp and the effective dates to process client requests for each record in the file. Details for processing such requests are further discussed in conjunction with FIGS. 4-8.

Processing engine 31 may index the information in storage medium 60 in a variety of application-specific ways suited to expedite processing of both updates to data as well as customer requests using the data. Processing engine 31 may index all fare data in a hierarchical, flat-file directory structure by carrier, and further index the fare data by city pair, irrespective of the fare class (or with a further index by fare class). In other words, each flat file may comprise a file containing fare records for one or more fare classes each associated with a particular carrier for a particular city pair. Application server 37 may then efficiently and accurately access each carrier-city pair file to search through all historically ordered fare class code records for that carrier-city pair. Processing engine 31 may also similarly index these records using any suitable database scheme. Other suitable indexing schemes may also be used; for example, fare data may be indexed into files by city pair and by fare class code, irrespective of carrier.

At step 212, notifier 33 informs application server 37 of the new updates, by some suitable method. For example, notifier 33 may include either the updates, their memory locations, or some other notification content to application server 37, whether application server 37 resides on computer 30 or on another platform, and whether application server 37 uses its own private storage medium or uses storage medium 60. Application server 37 is then synchronized with the most recent updates, and may process requests from client 70 by using information residing in any storage medium 60 or any private memory. A plurality of application servers 37 may also accurately access a plurality of memories 60 in a distributed processing environment.

Information management system 10 may implement the method illustrated in FIG. 3 by using software, firmware, or hardware. In one embodiment of the invention, information management system 10 uses a computer language such as Prolog to process various formats as the software is executed, and may thus reduce the need for laborious data conversion routines used with conventional systems.

FIG. 4 is an exemplary flowchart for processing a client itinerary utilizing the teachings of the present invention. Information management system 10 may receive and process requests from internal or external clients 70 using data received from data providers 80. Information management system 10 may also automatically perform processing required by users or internal clients 70 within an organization. Requested processing may also require one or more criteria to be satisfied.

In one embodiment of the invention, client 70 may request itinerary pricing for a particular trip such as, for example, a round trip flight between the MIA-LAX city pair using a selected airline carrier. This example will be used to illustrate one aspect of the invention. This example itinerary comprises two passengers, PA and PB, who wish to travel together. Criteria that should be satisfied to arrive at an accurate price for an itinerary may include applicable restrictions, such as routing and rules. Where, for example, the selected airline carrier often routes flights through its Houston hub, the itinerary may actually comprise four flight segments: (1) Miami to Houston (IAH); (2) Houston (IAH) to Los Angeles; and (3) & (4) return flights completing the round trip travel. Each flight segment comprises a portion of an itinerary between an origin and a destination point. The itinerary may require satisfaction of passenger-based criteria, such as valid pricing for more than one passenger traveling together, or where one passenger enjoys favorable pricing or is a non-paying customer. Although this example illustrates one particular itinerary, any type of itinerary may be processed by the invention.

An itinerary may be priced for one or more passengers. It is desirable to price any itinerary that includes more than one passenger so that the passengers travel together using the same flight segments. Furthermore, because some fares include passenger-based restrictions minimizing the total cost for such multiple passenger travel, the pricing for multiple passengers may desirably include choosing the lowest price that includes both passenger fares, rather than performing such calculations independently.

Many criteria, such as business criteria, for an itinerary may be suitably validated by a variety of known methods. For example, a round-trip itinerary comprises a destination city that is a turnaround point of the round trip. Consequently, pricing such an itinerary may include the use of directional fares to the destination city and return fares in the reverse direction to the city of origin. Thus, pricing a round-trip itinerary using only one-way fares valid only in one direction may not meet applicable business criteria.

On the other hand, pricing an itinerary may include complex processing to validate other criteria, such as the accuracy of a fare on a certain date, or whether applicable rules and fares are contemporaneously effective. Because travel reservation data typically comprises fare quotes for a city pair, information management system 10 may perform a plurality of steps to break down an itinerary into all possible combinations of such city pairs that provide the possible fares. In this embodiment of the invention and as discussed below, information management system 10 first automatically generates all combinations of possible fares that may suit the itinerary and then selects valid combinations that meet applicable restrictions. Information 30 management system 10 combines these fare combinations with applicable methods of construction to determine at least one valid pricing solution. An itinerary comprises multiple ways, or pricing solutions, for assembling and adding individual fares within an itinerary to achieve a total price for the entire itinerary from origin to destination. Each pricing solution combines specific fares that may validly use various methods of construction.

Methods of construction comprise combinations of fares that are valid for an itinerary and may be designated one-way, round-trip, open jaw, circle, end-on-end, point-to-point, and the like. For example, an open jaw method of construction might be used for travel that does not return to the city of origin (e.g., MIA-LAX-Jacksonville). Combinations of methods may be used to create an itinerary for travel between the city of origin and the city of destination. Each method of construction may comprise different fare prices. For example, round trip fares may be less expensive than point-to-point or circle travel between the same city pair. Thus, the itinerary may comprise a number of pricing solutions which each comprise a specific combination of fares determined by a method of construction. For example, the exemplary round trip itinerary may comprise two valid flight segments, and information management system 10 may either use two one way fares, or one round trip fare, to construct a total fare price for each passenger.

Information management system 10 may then calculate and select the lowest valid fare for the itinerary using the pricing solutions, if desired. Alternatively, all options or a subset thereof could be provided. Although steps 302-316 are illustrated as separate steps, various steps may be ordered in other logical or functional configurations, or may comprise single steps.

In step 302, application server 37 receives or requests an itinerary from client 70. In step 304, application server 37 may determine all possible fare breaks, or possible permutations for pricing the total fare, for the city pair. A fare break may comprise one or more flight segments, and may be used to determine applicable city pairs for which the fares are valid. These fare breaks may use one or more fare components, each of which comprises a portion of an itinerary between consecutive fare break points, and may comprise one or more flight segments.

For example, the exemplary itinerary may comprise a plurality of possible fare breaks for the four flight segments, from one to four fare components, whether valid or not. A one-fare component fare break comprises travel from MIA-IAH-LAX-IAH-MIA. This exemplary itinerary comprises three possible two fare component solutions. The first includes a MIA-IAH flight segment and a IAH-LAX-IAH-MIA flight segment. The second possible two-fare component solution comprises a MIA-LAX flight segment with a stopover in Houston and a LAX-MIA flight segment with a stopover in Houston. The last possible two-fare component solution comprises a MIA-IAH-LAX-IAH flight segment and a IAH-MIA flight segment. In this example, the total fare may be priced by summing the two components. The three- and four-fare component solutions may be similarly determined. Information management system 10 may construct solutions comprising as many fare components as necessary to satisfy an itinerary, including other possible connecting cities.

In step 306, application server 37 determines the validity of the possible fare breaks determined in step 304, and selects the valid fare breaks. Validity of a fare break may be determined by using applicable rules. For example, of the one- and two-fare component solutions discussed above, only the second two-fare component solution may be valid, because the same airport (IAH) may not be transmitted twice within a fare component. Fare breaks may also be invalidated by other criteria, such as where there may be no published fare, an airline change may be required, or where travel over a surface segment may be required.

In step 308, application server 37 determines valid fares for each valid and unique fare component. In one embodiment of the invention, application server 37 may retrieve all fares published for the LAX-MIA city pair for the airline carrier. These fares may be stored and indexed by any suitable method, including the one discussed in conjunction with FIG. 3. For each of these fares, application server 37 determines and selects the most current historical valid price, using any method, including the one discussed in conjunction with FIG. 5. Application server 37 may also verify other validation criteria, such as special directional pricing, booking code or fare classes, or flight segment routing. For example, a LAX-MIA fare may differ from a MIA-LAX fare due to directional specials or for other reasons. For this particular fare component, application server 37 may determine three one-way fare amount-fare class pairs, F1, F2 and F3, and another plurality of round-trip fare amount-fare class pairs, F4-F8. Each fare class entry is associated with a fare price. Focusing on the one-way fare amount—fare class pairs, exemplary fare amount-fare class pairs may be F1=$150.00, F2=$225.00, and F3=$350.00.

Figure 5:
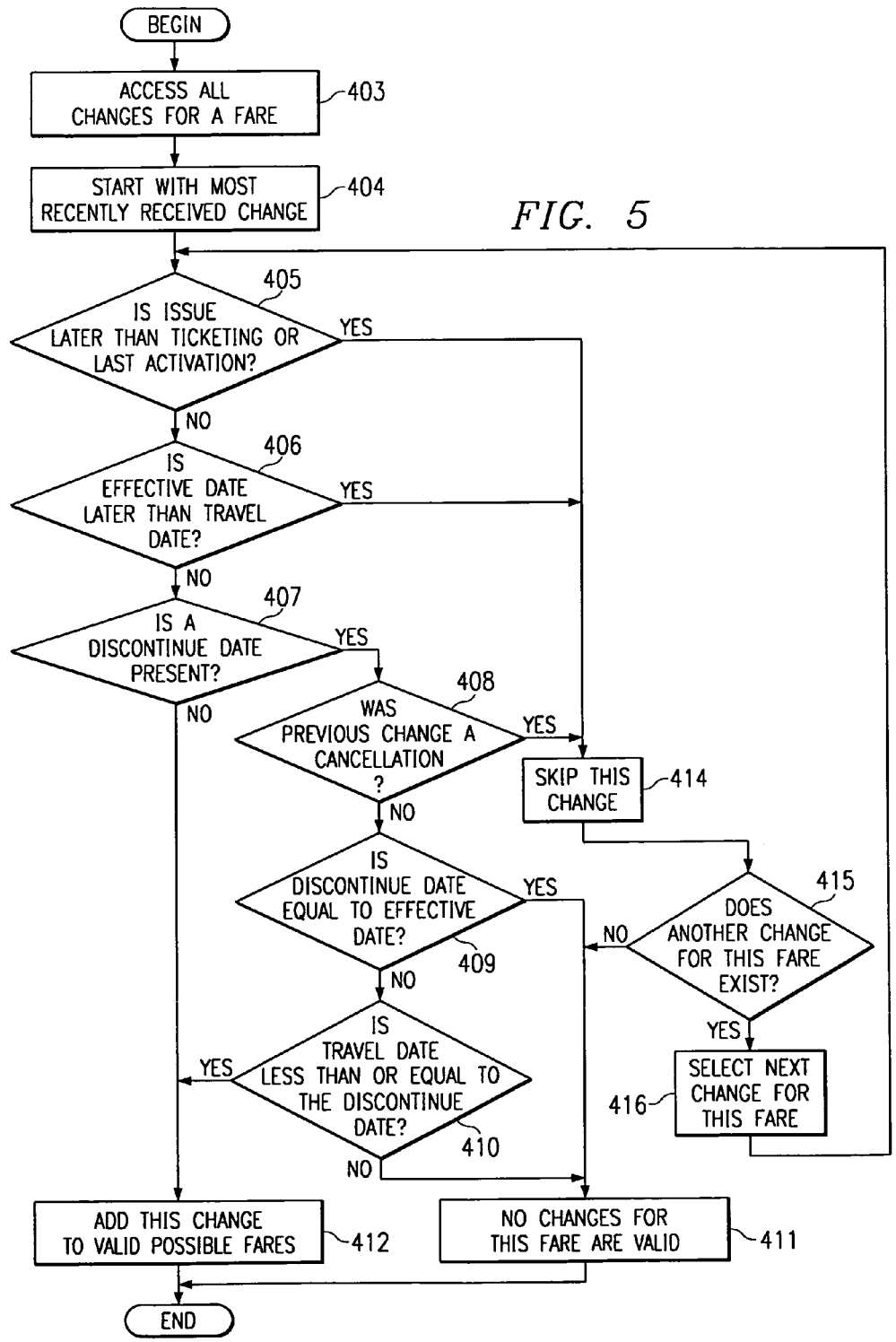
FIG. 5 illustrates an example of a flowchart describing a method for accurately identifying and retrieving time-sensitive information utilizing the teachings of the present invention.

Application server 37 may then similarly process the LAX-MIA fare component, and may also utilize a method such as is discussed in FIG. 5. In some cases, there may be no fare differences between the LAX-MIA and MIA-LAX fare components, as previously discussed. In this exemplary itinerary, application server 37 determines three additional one-way fare amount-fare class pairs, F9, F10 and F11, and another additional plurality of round-trip fare amount-fare class pairs, F12-F15. Focusing on the one-way fare amount—fare class pairs, exemplary fare amount-fare class pairs may be F9=$75.00, F10=$125.00, and F11=$150.00. Application server 37 may also include logic that utilizes identical fare amount-fare fare class pairs that are common to both fare components.

Fare amount-fare class pairs may also be similarly validated for valid methods of construction for the three- and four-component pricing solutions. The number of valid fare amount-fare class pairs will typically vary according to the number of fare records published by each carrier, and the fares that may be valid for the travel date in the itinerary. Furthermore, some fares may be identical between the various pricing solutions. For example, one point-to-point fare for a three-fare component solution may be identical to another point-to-point fare for a two- or four-fare component solution, depending on fare validation criteria such as itinerary, applicable rules, footnotes, and so on.

Application server 37 may also utilize other criteria, such as business criteria, (either from the service provider or customer), to construct the possible pricing solutions for each fare break combination in step 310. Application server 37 may utilize logic to construct various priceable units, which may be priced as a separate entity. For example, a priceable unit, such as a one-way fare that qualifies for pricing in its own terms independent of any other fare component, may be ticketed separately within an itinerary. Other rules and restrictions may be used to construct the possible pricing solutions, including other business criteria. If more possible pricing solutions exist for the fare break at step 312, then application server 37 returns to step 310 to process more priceable units for the fare break. If no more possible pricing solutions exist for the fare break at step 312, then application server 37 may process more fare breaks in step 314.

Because the exemplary itinerary returns to the point of origin with no travel gaps, possible pricing solutions comprise a round trip and two point-to-point solutions placed end-on-end. Other itineraries may be satisfied by using priceable units within other methods of construction, such as circle trip or open jaw, which result in valid combinations of fare components. For example, if the itinerary returned from LAX to Jacksonville rather than to MIA, application server 37 might utilize an open-jaw pricing solution rather than a round trip pricing solution.

In step 316, application server 37 may determine and select a lowest valid pricing solution for the itinerary. Exemplary methods for selecting the lowest valid pricing solution are shown and discussed in further detail in conjunction with FIGS. 6-8. The first method may select a valid combination of fares that minimizes or maximizes a mathematical operation on the fares. For example, the method may be used to minimize a sum of a valid combination of fares. The second method includes determining the lowest valid pricing solution for both passengers in the exemplary itinerary.

FIG. 5 is an exemplary flowchart for accurately identifying and retrieving information utilizing the teachings of the present invention. Information management system 10 may first identify relevant information applicable to process a client's request. Information management system 10 then efficiently and accurately locates the relevant information by searching through applicable records in storage medium 60 by their associated time-stamps. Information management system 10 may quickly access the applicable records by time stamp to identify the currently applicable fare.

In one embodiment of the invention, information management system 10 efficiently calculates an accurate price that satisfies a client's requested travel itinerary between two travel locations, as discussed in conjunction with FIG. 4. By searching for all valid fare class codes for the city pair within the itinerary, information management system 10 may provide or use for client 70 a complete set of available accurately priced choices that suit the itinerary.

In step 403, application server 37 accesses all records for the requested fare class. Such records may be resident in application server 37 or in a flat file or database resident in storage medium 60. Application server 37 processes records beginning with the most recently time stamped record in step 404. In step 405, application server 37 determines whether the issue date of the time stamp is later than the time of ticketing or the last activation time. If the issue date is later than time of ticketing or the last activation time, then the record time stamped with such a time of ticketing or the last activation time is not valid and the method returns to step 414. If the issue date is not later, then information management system 10 proceeds to step 406.

In step 406, application server 37 determines whether the fare is effective as of the travel date. If the effective date is later than the travel date, the fare is not valid for this itinerary, and the method returns to step 414. In one embodiment of the invention, information management system 10 may also provide a guaranteed air fare by additionally determining whether the fare is effective as of the ticketing date. Such a determination may be performed as an additional step or in conjunction with step 406. If the fare is effective as of the travel date (or ticketing date, if applicable), application server 37 proceeds to step 407 to determine whether the fare has been discontinued. If not, the fare may be a valid fare for use in the client itinerary, and application server 37 adds this fare to a set for further rules and routing assessment in step 412. The set may comprise a data structure such as a list or an array.

In some applications, information management system 10 may include additional logic and/or steps to process additional information from cancellation and discontinuation dates within the fare records. For example, in some foreign countries, the life of a fare may be extended when a fare is cancelled and the date of cancellation is moved into the future, thus creating a future effective fare. If a fare has been discontinued in step 407, information management system 10 then determines in step 408 whether a prior update of the record was a cancellation of the fare. If so, the information management system 10 proceeds to step 414, where it will skip the prior cancellation change and detect a future effective fare.

Thus, if in steps 405, 406, 407 or 408 the current fare record under consideration does not meet the requirements for the client's itinerary, application server 37 searches for another update. In this embodiment, application server 37 inquires whether another record for this fare class exists in step 415 and if so, proceeds to the prior historical updates for the fare class in step 416. For a flat file, a prior fare record comprising the same fare class may be the previous entry in the file. If the previous entry in the file comprises another fare class code, application server 37 may search backwards through the flat file until it locates the proper entry. Application server 37 then proceeds to step 405 to repeat any applicable steps for that entry.

In some applications, fares may be cancelled effective immediately, or at a certain time, such as midnight. In such applications, cancellations that are effective immediately may have the same date for the effective and discontinue dates. If a prior update was not a cancellation of the fare in step 408, application server 37 further inquires in step 409 whether the discontinuation date of the record is the same as the effective date of the update. If so, the fare has been cancelled and is not valid, and application server 37 proceeds to step 411. If not, then in step 410 application server 37 determines whether the desired date is prior to or on the same date as the discontinuation date. If so, then the fare may be a valid fare, and application server 37 proceeds to step 412. If not, then the system proceeds to step 411. In step 411, application server 37 determines whether no valid fare updates exist for the city pair, in which case application server 37 may not use this fare to satisfy client 70's itinerary.

In step 412, application server 37 identifies this fare as a possible valid fare that may be further validated using additional criteria, including rules and routing. Application server 37 may add each identified possible valid fare to a list, a table, or otherwise identify the possible valid fare by any suitable method. In one embodiment of the invention, application server 37 compiles a plurality of lists of possible valid fares that may be used to form a valid pricing solution using methods such as those described in conjunction with FIGS. 6-8.

FIG. 6 is an illustration of a method for selecting a valid combination of values that minimizes or maximizes a mathematical result of the combination utilizing the teachings of the present invention. For example, the method may minimize or maximize the sum or product of the valid combination.

FIG. 6 illustrates a grid 500 comprising nine entries 501-509. Entries 501-509 comprise all of the possible combinations for two lists A and B, where each list comprises three items. Lists A and B may comprise any data structure suitable to hold or to access a plurality of items. By way of example and not by limitation, lists A and B may comprise valid personnel salary—personnel class pairs for project members that satisfy project requirements, in one embodiment of the invention. In other words, each may list may comprise a personnel class such as, for example, engineer, accounting, or administrative and a corresponding salary therefor. In another embodiment, lists A and B may comprise valid fare amount-fare class pairs for fare components that satisfy the itinerary as described in conjunction with FIG. 4. This example will be used to illustrate one aspect of the invention. Such fares in lists A and B may have been generated by any suitable method, such as the one discussed in conjunction with FIG. 5. Exemplary list A comprises items A1=150, A2=225, and A3=350, and exemplary list B comprises items B1-B3, where B1=75, B2=125, and B3=150. These items comprise the valid fare amount-fare class pairs F1-F3 and F9-F11 found for the valid two-fare component fare breaks (for the point-to-point pricing solution), as was discussed in conjunction with FIGS. 4 and 5. Entries 501-509 may similarly comprise the possible priceable unit combinations, or sums, for these fares.

Information management system 10 desirably minimizes the processing needed to find the lowest total combination that is valid with respect to applicable requirements or restrictions. For example, combining certain fare components from list A with others in list B may or may not be restricted. By beginning with a lowest combination (in this case A1 and B1) and validating the lowest combination and the subsequent next-lowest combinations in a selected order, information management system 10 ensures that a lowest total valid combination will be found, if one exists, with minimal processing. This approach may eliminate overprocessing found in typical brute force approaches that either perform validation on all combinations, or select a value using pruning algorithms that may not actually be the lowest value. Any suitable calculation of data values that is responsive to a mathematical operation, or combinations thereof, that is performed on each combination and results in the selected order may be used. For example, the sum of the two lowest values in lists A and B results in the lowest sum of any combination from lists A and B. Each mathematical operation may comprise an equivalent expression achievable by a variety of methods. The method is further described using a sum as the exemplary mathematical operation.

In one embodiment of the invention, information management system 10 desirably identifies the lowest valid fare that suits the travel requirements for an itinerary. Information management system 10 may first sort the lists, then iteratively generate sets of combinations of sums to be considered. The lowest of these sums is then tested to determine whether it is a valid combination as to applicable rules. New sets of combinations are generated and lowest sums within the sets are tested until a valid combination is preferably found. The lists need not be sorted, but sorting provides a convenient method to find the record with the lowest remaining value in the list during the iterations.

Each list A and B may first be sorted in ascending order, beginning with the lowest fare value, followed by the next lowest fare value, and so on. Each list may also be sorted in descending order. Items from list A and B will populate the vertical and horizontal grid 500 in ascending order. Thus, grid 500 as illustrated in FIG. 6 conceptually comprises the lowest sum combination in grid element 501, and the highest sum combination in grid element 509. Any data structure could be used to implement the disclosed process and grid 500 is used for illustrative purposes only.

Whether or not lists A and B are pre-sorted, information management system 10 first creates a set comprising items to be considered, in this case the two lowest values A1 and B1 in lists A and B. Information management system 10 then sums the combination of A1 and B1, in this case to 225, for grid element 501, which becomes the new set gridline (not explicitly shown). Information management system 10 then determines whether the combination is valid in light of all applicable criteria. In this embodiment, applicable criteria comprise rules, restrictions, fare components and priceable units, and the like. If so, the sum is the lowest valid combination.

If the combination is not valid, the lowest valid combination of fares from lists A and B may be recursively found, if a valid combination exists from additional combinations from lists A and B. In this case, the tested invalid combination represented by grid element 501 touches both a horizontal edge and a vertical edge of a set gridline. Information management system 10 may extend the set gridlines 525 in the dimension of each edge touched to increase the size of a set. (In grids with more than two dimensions, the same type of expansion occurs.) The increased size set gridline 525 is illustrated in FIG. 6 as a bold border.

Information management system 10 then generates and sums all combinations for items B2 and A2. Thus, grid elements 502, 503, and 504 comprise exemplary sums of combinations A1 and B2=275, A2 and B1=300, and A2 and B2=350, respectively. In other words, where the last tested combination includes one or more list items that comprise the highest list item from that list currently under consideration in the set, the set is expanded to consider the next lowest item on that list by generating all combinations of that element with elements already in the set from other lists. In this example, the first rejected value reflects the highest value from each of lists A and B, so the set is expanded in two dimensions.

Information management system 10 then chooses the next lowest combination in the set and determines whether the next lowest combination 275 is a valid combination. If it is not, because this combination is at set gridline 525 in the horizontal dimension, (i.e., the dimension for list B), information management system 10 generates additional sum combinations 505 and 506 to add to the set. Information management system 10 then determines whether the next lowest combination, or grid element 505, is valid. In this situation, although this combination is at the new set gridline for the B dimension, list B has no more items from which to generate new combinations for the set. Therefore, if the combination in grid element 505 is not valid, information management system 10 proceeds to grid element 503, a member of the set within the set gridline that was generated but not tested in prior steps.

Information management system 10 may determine a sum for each untested combination, determine the lowest untested sum in the set, and test whether that combination is valid. Each time a combination is tested and found not valid, new combinations are generated, if the invalid combination touches the set gridline. If the gridline is not touched, then the next lowest untested combination is chosen for testing without expansion of the set. Thus, for example, should the combination in grid element 503 be found not valid, sum combinations for grid elements 507, 508, and 509 are generated because grid element 503 touches the set gridline in the A-dimension at grid element 507, and the set gridline is extended down. If after generating all combinations for the items in lists A and B no valid combination is found, information management system 10 may not use the combination of any items in lists A and B to validly determine a pricing solution. An appropriate message may be generated to indicate that no valid combination was found.

In one embodiment of the invention, information management system 10 may link lists A and B to the tested combinations, in order to keep track of the entries that comprise the lowest valid combination, as well as those entries whose combinations have been tested and are not valid. In this and other embodiments of the invention, the method may be executed using a language such as Prolog.

Such a method as illustrated in FIG. 6 may minimize the number of calculations performed by information management system 10. For example, if the combination in grid element 502 is determined to be valid as to all applicable rules and restrictions, information management system 10 would have generated four combinations and validated fare components for three fares, resulting in a total of six validations. In this case, information management system 10 would have also performed a total of two priceable unit combinations. Because there are many possible combinations when lists are larger, the invention may result in substantial computation savings.

The method as conceptually illustrated in FIG. 6 may be implemented in hardware, firmware or software. Software implementation may use any suitable processing techniques, including object oriented programming. For example, information management system 10 may use objects, tables, or arrays, and/or any suitable method to sort lists A and B in ascending order. It is also within the scope of the invention for information management system 10 to generate the combinations and/or all sums for each item in lists A and B prior to testing the validity of each combination. The edges or set gridlines as described in conjunction with the conceptual grid in FIG. 6 may also be denoted by tracking the positions of such generated combinations for each item in each list A and B. Any type of data structure may be used for lists A and B and the sets.

Although FIG. 6 illustrates two lists and a grid 500 comprising a two-dimensional 3×3 array, it is also within the scope of the invention for information management system 10 to process a plurality of n lists of m items. Such processing results in an n dimensional grid. Thus, for n=3, information management system 10 would suitably sort items in lists A-C, and utilize a three-dimensional grid 500 for which items C1-Cm would comprise a third axis. Instead of two edges, information management system 10 would track three grid edges of a set gridline and generate additional combinations in the additional third dimension as required. Also, the number of items in each list does not need to be the same.

Information management system 10 may also cascade the method. For example, information management system 10 may minimize the lowest valid summed combination of values from lists A, B, and C. First, information management system 10 determines the lowest valid summed combination from lists A and B, as described above. Information management system 10 desirably retains the values in lists A and B that were last tested to achieve such lowest valid summed combination. For example, information management system 10 may link such a lowest valid summed combination from lists A and B to lists A and B. Information management system 10 may then proceed in minimizing the lowest valid summed combination of values from list C and from lists A and B.

To illustrate, information management system 10 first creates the set comprising items to be considered, in this case the two lowest values—C1 in list C, and the lowest valid summed combination from lists A and B. Information management system 10 then sums the combination for grid element 501, which becomes the new set gridline (not explicitly shown). Information management system 10 then determines whether the combination is valid in light of all applicable criteria, including rules, restrictions, fare components and priceable units, and the like. If so, the sum is the lowest valid combination.

If not, the lowest valid combination of fares from lists C and A and B will be found, if at all, in a next set of combinations, i.e., from a combination that has not yet been generated. Because the tested combination represented by grid element 501 touches both a horizontal edge and a vertical edge of a set gridline, information management system 10 may extend the set gridlines 525 in the dimension of each edge touched to build a new set. Information management system 10 then generates and sums all combinations for items C2 and the next lowest combination from lists A and B. Information management system 10 selects combinations from lists A and B that have not yet been tested, because they comprise the next lowest valid combinations. Information management system 10 may generate such a next lowest valid combination from lists A and B by using, for example, static data such as the linked lists discussed above. Information management system 10 first determines the next lowest valid combination of items from lists A and B, and then generates and sums combinations of such a combination and item C2.

Information management system 10 follows the steps as discussed above to find a valid combination of items from lists C and A and B. In this way, information management system 10 may determine a sum for each untested combination for lists C and A and B, determine a lowest sum of the untested combinations, and test whether the combination of the lowest sum is valid. Each time a combination is tested and found not valid, new combinations are generated, if the invalid combination touches the set gridline. Software methods used to generate the lowest valid combination may keep track of the position of that combination in the set so that it can continue at that point if a cascaded process later rejects the combination.

To illustrate, if the method were to comprise several cascaded process levels, information management system 10 may first generate the lowest valid combination for each level. Information management system 10 may then test whether the combination at the topmost cascaded process level is valid. Each level may comprise its own or identical validation criteria. For example, a first cascaded process level may test whether two fares may be used together. A second cascaded process level may test whether two passengers may fly together using the fares. For example, one of the passengers may be an adult and the other a child. The second level cascaded process may validate whether the child is flying with the adult. The level at which a combination may become invalid may be difficult to determine as the number of levels increases. By keeping track of the positions of each combination in a set at each level, information management system 10 may continue to generate a next-highest valid combination for each level, whenever any cascaded process level, including the topmost level, rejects the combination. It is also within the scope of the invention for cascaded process levels to comprise a priori validation when applicable. Such a priori validation may quickly eliminate invalid combinations. For example, a first cascaded process may not only determine whether two fares are combinable, but also whether two passengers may fly together.

It is also within the scope of the invention for the lists to comprise values across a plurality of applications and industries. By way of example and not by limitation, each list may comprise salaries for personnel to be considered for staffing a project. The project may require personnel to meet applicable criteria in order to be properly staffed. In this case, FIG. 6 illustrates a method for staffing the project with the lowest personnel costs. Similarly, the values in each list may comprise costs for parts, services, and/or any resources that may need to be purchased from suppliers and that can be combined in various ways. For example, utilizing applicable criteria, the method as illustrated in FIG. 6 may determine a lowest cost combination of suitable suppliers, or lowest-priced combination of parts, that may meet a manufacturer's needs. As another example, an energy provider may be interested in a lowest-priced combination that the provider may produce and purchase for energy resources or services for sale or resale. The method may similarly use applicable criteria related to such energy resources, their sale, resale, and/or distribution to determine the lowest cost combination. In yet another example, a software or systems provider may desire a lowest-priced combination of software modules, objects, libraries, and/or systems. The method may similarly utilize applicable criteria related to software systems compatibility and/or the development or sale thereof.

Furthermore, information management system 10 may also utilize the method above to maximize the combination. Information management system 10 may also first order lists A and B in descending instead of ascending order, and then select valid combinations that maximize the sum, product, or any other suitable mathematical result, of the combination. When using the invention for maximization, the highest value from each list is chosen initially and the set's highest remaining combination, rather than the lowest, is tested. Growth of the set uses the next highest value on the lists in question. Such a method may also be advantageous over various applications and industries. Such applications may include, for example, maximizing a total sum of discounts, profits, investment returns, or the life expectancies of parts that may be used in a manufacturing assembly.

It is also within the scope of the invention for information management system 10 to extend the set gridlines 525 without generating and/or performing the mathematical operation on all combinations. For example, information management system 10 may generate only a grid element immediately adjacent, or to the right of, a tested combination along a horizontal dimension when the grid element above it along the vertical dimension has been tested. Information management system 10 may also generate the grid element below the tested combination along the vertical dimension provided that the grid element to the left of it along the horizontal dimension has been tested.

For example, if grid element 501 is tested and found to be invalid, then information management system 10 may generate immediately adjacent grid element 502, and immediately below grid element 503. These new grid elements are added to the set. Information management system 10 then may choose the next lowest combination in the set and may determine whether the next lowest combination 275 (grid element 502) is a valid combination. If it is not, then information management system 10 generates grid element 505 immediately adjacent to grid element 502. Grid element 504, which is immediately below grid element 502, is not generated since grid element 503 has been generated, but not yet tested.

The method may be generalized to any number of lists by similarly generating new grid elements in each direction for each dimension of the grid. For example, information management system 10 may utilize a third axis to track an additional list C, as previously described. Information management system 10 may generate a grid element above a tested combination along the third axis when the grid element below it along the third axis has been tested.

Figure 7:
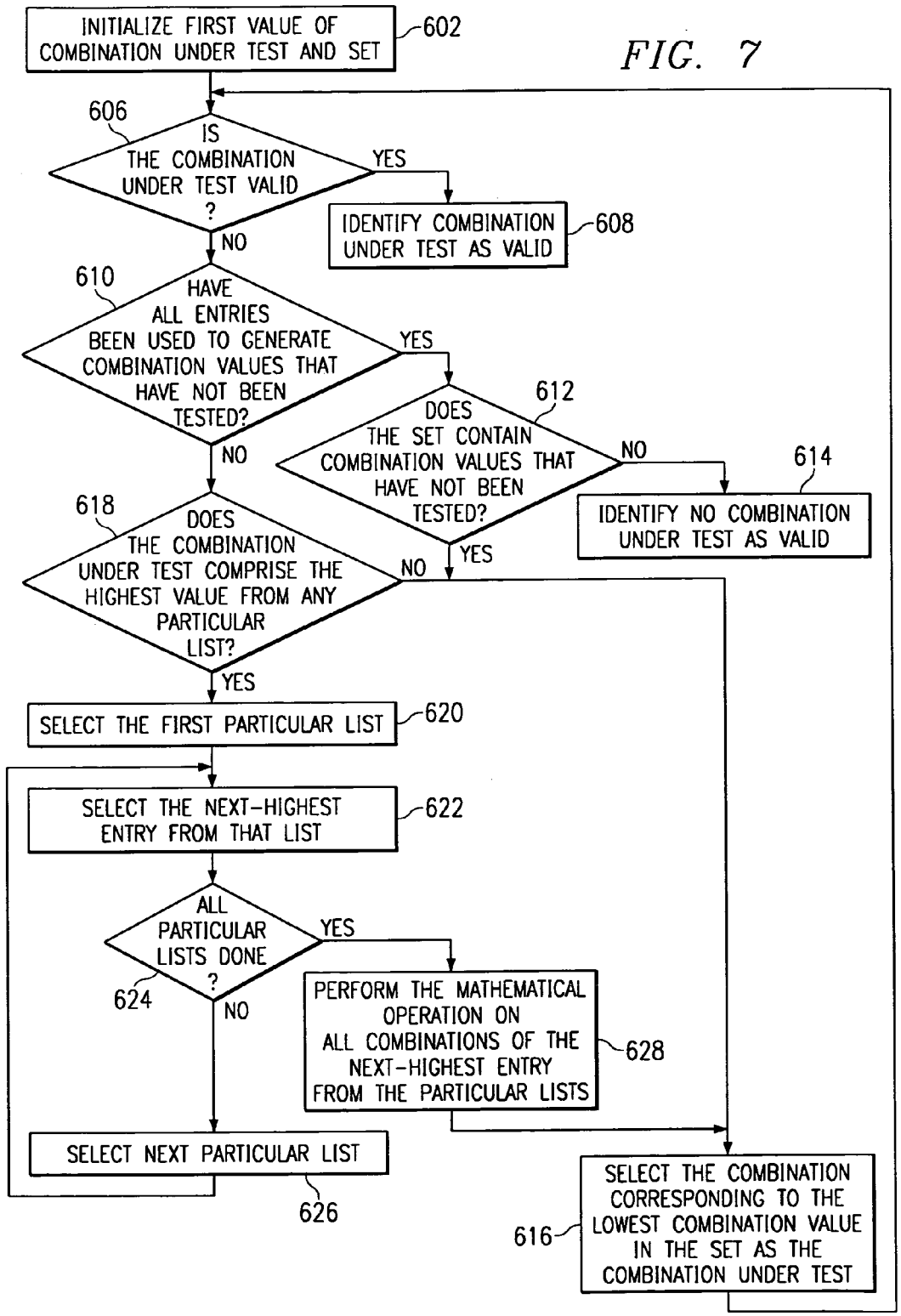
FIG. 7 illustrates an example of a flowchart describing a method for selecting a valid combination of values from a plurality of lists that minimizes or maximizes a mathematical operation of the combination utilizing the teachings of the present invention.

FIG. 7 illustrates an example of a flowchart describing a method for selecting a valid combination of values from a plurality of lists that minimizes a mathematical operation of the combination utilizing the teachings of the present invention. While the steps illustrated in FIG. 7 form an example method for identifying a lowest valid combination, they may be adapted to form a method for selecting a valid combination of values from a plurality of lists that maximizes a mathematical operation of the combination, as is discussed below. Each of steps discussed below may be performed using software running on a single or multiple computers 30, in firmware, or hardware. Although steps 602-628 are illustrated as separate steps, various steps may be ordered in other logical or functional configurations, or may comprise single steps. In one embodiment of the invention, the steps may be programmed using Prolog.

FIG. 7 comprises generally the steps of initializing a set and a first combination under test, testing whether the combination under test is valid, determining whether all entries have been tested, determining whether the set needs to be expanded and if so, selecting the highest entry from an applicable list, performing the mathematical operation on all applicable combinations and, if the combination under test is valid, selecting the valid combination of values that minimizes the combination. The selection process graphically illustrated by and discussed in conjunction with FIG. 6 may, for example, comprise one embodiment of this general method.

The method begins with a plurality of lists either provided to or generated by information management system 10. Each of the plurality of lists comprises entries associated with a value that is responsive to a mathematical operation, such as addition or multiplication, as discussed in conjunction with FIG. 6.

Information management system 10 may optionally include an initialization step 602. Information management system 10 may perform some, all, or none of the steps discussed as initialization step 602, depending on the needs of information management system 10. Furthermore, applicable steps illustrated in FIG. 7 may comprise information management system 10 may utilize any process, including recursion, to perform the method.

For example, in step 602, information management system 10 may initialize a first combination collectively from the entries from each of the plurality of lists to form the first set. Information management system 10 may form a first combination value by performing a mathematical operation responsive to an entry from each of the plurality of lists on the first combination. For example, the first combination in the example illustrated in conjunction with FIG. 6 comprises A1 and B1, and the first combination value comprises 225. Information management system 10 may place the first combination value in a set of one or more combination values. Information management system 10 may designate the first combination as the combination under test and the first combination value as the value of the combination under test. Information management system 10 may also initially designate the combination under test as invalid.

Information management system 10 then processes as many of the entries from each of the plurality of lists as necessary to determine and to identify the lowest valid combination. For example, in step 606, information management system 10 queries whether the combination under test is valid. If so, information management system 10 identifies the combination under test as valid and ends the method at step 608.

On the other hand, information management system 10 must process more entries from each of the plurality of lists or more combinations in the set while the combination under test is invalid. Thus, if the combination under test is invalid, information management system 10 next in step 610 queries whether all entries on each of the plurality of lists have been used to generate one or more combination values in the set. If so, information management system 10 next in step 612 queries whether the set contains no more combination values that have not been previously tested. If so, information management system 10 proceeds to step 614, and identifies no combination under test as valid and indicates that all combinations in the set have been tested, and ends the method. If all combinations in the set have not been tested, information management system 10 proceeds to step 616 for selecting the combination corresponding to the lowest combination value remaining in the set as the combination under test.

If in step 610, all entries on each of the plurality of lists have not been used to generate one or more combination values in the set, information management system 10 proceeds to step 618. In step 618, information management system determines any or all lists for which the combination under test comprises, for a particular list, the highest value from the particular list used to generate any of the combination values in the set. If not, the set need not be expanded, and information management system 10 proceeds to step 616 for selecting the combination corresponding to the lowest combination value remaining in the set as the combination under test.

If information management system 10 determines any particular lists for which the combination under test comprises the highest value from the particular list used to generate any of the combination values in the set, information management system 10 expands the set. First, information management system 10 selects that particular list in step 620. Information management system 10 then proceeds to step 622 to select the next-highest entry from that particular list.

If in step 624, there are more particular lists for which the combination under test comprises the highest value from the particular list used to generate any of the combination values in the set, information management system 10 then selects the next particular list in step 626, and returns to step 622. Thus, information management system 10 repeats steps 622, 624, and 626 for all of the particular lists for which the combination under test comprises the highest value from that particular list used to generate any of the combination values in the set.

If in step 624 there are no more particular lists for which the combination under test comprises the highest value from the particular list used to generate any of the combination values in the set, information management system 10 then proceeds to step 628. In step 628, information management system 10 performs the mathematical operation on all combinations of the next highest entry from each of the particular lists and each entry from each of the plurality of lists other than the particular list that has been used to generate one or more combination values in the set. Information management system 10 then proceeds to step 616 to select the combination corresponding to the lowest combination value remaining in the set as the combination under test.

Information management system 10 then returns to step 606 to query whether the combination under test is valid. As discussed above and in conjunction with FIG. 6, information management system 10 repeats the method for as many entries as necessary to determine and to identify either a combination under test as valid, or no combination under test as valid. The method may also sort the plurality of lists in ascending order.

The method illustrated in FIG. 7 may also be used to maximize a valid combination with a few minor changes. For example, in step 618, information management system may determine any or all lists for which the combination under test comprises, for a particular list, the lowest, rather than the highest, value from the particular list used to generate any of the combination values in the set. Similarly, in steps 622 and 628, information management system 10 may select the next-lowest entry from the particular list and perform the mathematical operation on all combinations of the next-lowest entry from each of the particular lists and each entry from each of the plurality of lists other than the particular list that has been used to generate one or more combination values in the set. Finally, in step 616, information management system 10 may select the combination corresponding to the highest combination value remaining in the set as the combination under test. All of the other steps may remain the same, and information management system 10 repeats the method for as many entries as necessary to determine and to identify either a combination under test as valid, or no combination under test as valid, where the combination under test represents the highest valid combination.

The method illustrated in FIG. 7 may also further reduce the number of combinations that are generated with a few minor changes. For example, in step 628, to minimize a valid combination, information management system 10 may perform the mathematical operation on all combinations of the next highest entry from each of the particular lists and each entry from each of the plurality of lists other than the particular list that has been used to generate the combination under test. Information management system 10 may similarly maximize a valid combination by performing the mathematical operation on all combinations of the next lowest entry from each of the particular lists and each entry from each of the plurality of lists other than the particular list that has been used to generate the combination under test.

This method may use any criteria suitable for validating whether the combination under test is valid. Suitable examples for the travel industry and examples of other applications were discussed in conjunction with FIG. 6. Other criteria depend on application or industry needs, and may include cost criteria, business criteria, mathematical criteria, or any other applicable rules, restrictions, or parameters.

This method may be performed recursively, and by using any suitable processing techniques, including object oriented programming. For example, information management system 10 may use objects, tables, or arrays, and/or any suitable method to sort the plurality of lists A and B in ascending order. It is also within the scope of the invention for information management system 10 to generate the combinations and/or mathematical operations for each item in the lists prior to testing the validity of each combination. Any type of data structure may be used for the lists and the sets.

Figure 8:
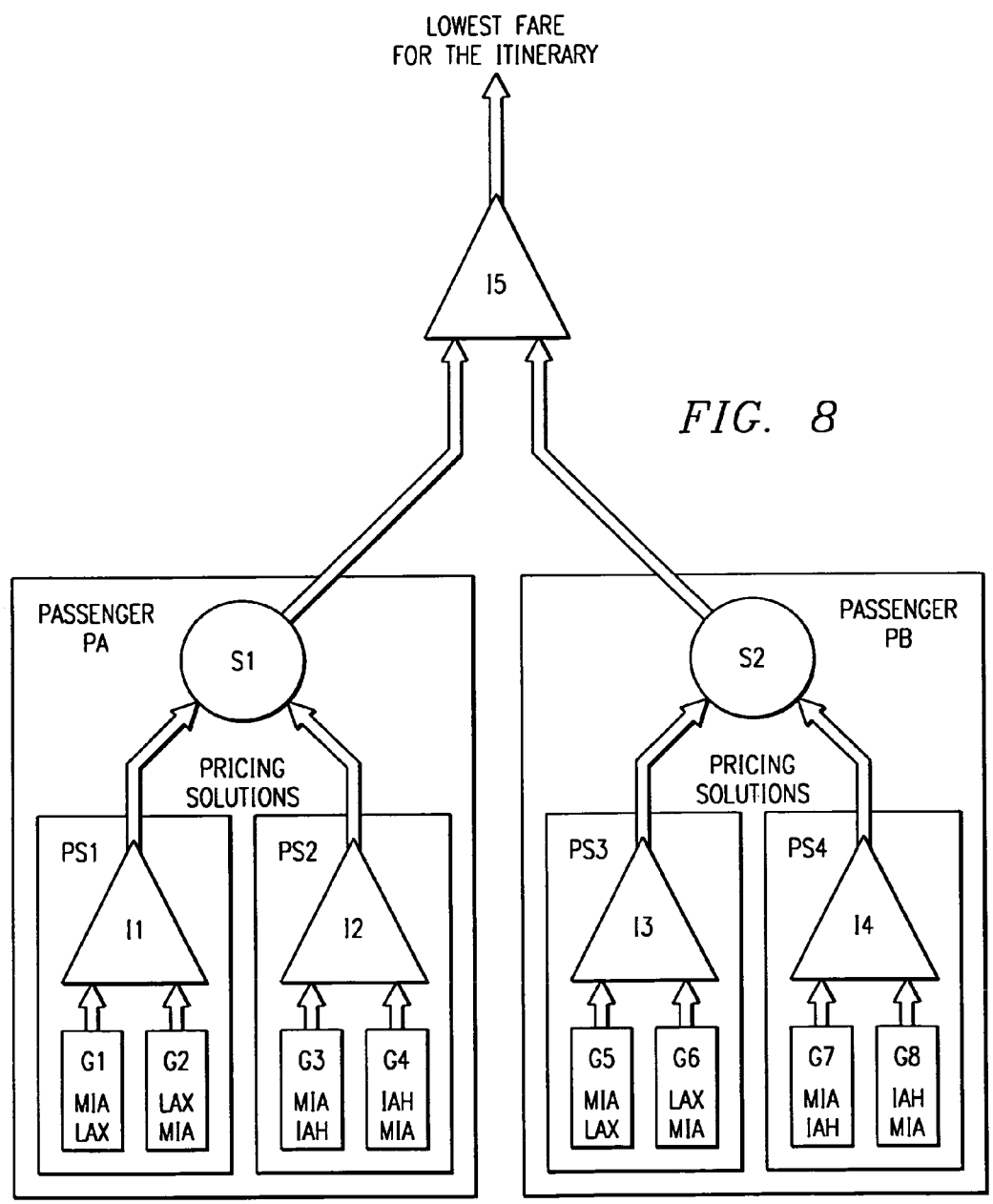
FIG. 8 illustrates an example of a method for minimizing or maximizing a value according to a desired criterion utilizing the teachings of the present invention.

FIG. 8 is an example of a method that may be used to minimize or maximize a value according to desired criteria. The method comprises generally the steps of determining a next lowest value from an internal list of available values, and determining a valid combination of values from a plurality of lists that minimizes the total sum of the combination. The method then returns a next lowest answer of at least two minimized total sums. In other words, a plurality of software objects performing a method such as that described in connection with FIG. 6 can be combined in various combinations to allow minimization or maximization of complicated combinations of data without programming each combination individually.

The method as illustrated in FIG. 8 comprises iterators I1 through I4, with inputs from lists G1 through G8. This is an example of the method only, and any combinations of selectors and/or iterators can be used. Selectors S1 through S2 process as inputs the outputs of iterators I1 through I4, and iterator I5 processes as inputs the outputs of selectors S1 and S2. In this embodiment, iterator I5 processes two approximately symmetric threads—one for each passenger in the itinerary discussed in conjunction with FIG. 3. Similarly, each selector S1 and S2 processes two symmetric threads—one for a round trip pricing solution, and one for a point to point pricing solution. Any number of generators, iterators, and selectors may be used to minimize or maximize a value according to the desired criteria.

Each iterator can be any software process, object, engine, etc. that may determine a valid combination of values from a plurality of lists that minimizes the total sum of the combination. Each iterator may also enumerate a list of such combinations in a desired order, for example, ascending order. Such an iterator can use the method described above, or use other minimization or maximization methods. Selectors S1 and S2 each represent any process that may return a next lowest answer from one or more processes, and/or enumerate a list of such answers in a desired order, e.g., ascending order. Each generator G1-G8 represents any process that may return a next lowest value from an internal list of available values. For example, each generator may return the next valid lowest fare from an internal list of available fares by validating rules, footnotes, and so on for each fare. In one embodiment of the invention, each generator G1-G8 may enumerate a list of the lowest valid fares, in a desired order, e.g., ascending order of the fare. Any method for each of these processes may be used. Exemplary methods for the generator and iterator processes are discussed in conjunction with FIGS. 5-7, respectively. As discussed previously in conjunction with FIG. 4, fares may comprise identical or different fare components. In this embodiment of the invention, each pricing solution is separately processed for each method of construction, and for each passenger.

In one embodiment, information management system 10 calculates a lowest fare for an exemplary two-passenger itinerary that includes travel between the MIA-LAX city pair, as discussed in conjunction with FIG. 4. Pricing solutions PS1 and PS2 are determined for each passenger PA and PB for round trip and point-to-point travel, respectively. In this embodiment, pricing solutions PS1-PS4 each comprise two fare components each represented by two generators, as was discussed in conjunction with FIG. 4.

Information management system 10 may perform the algorithm individually for passengers PA and PB, and for each pricing solution PS1-PS4. In such an embodiment, for passenger PA, information management system 10 may be provided or generate four lists of valid fares G1-G4 to suit the requested two-fare component itinerary by any suitable method, including the methods discussed in FIGS. 4 and 5. Lists G1 and G2 comprise the two fare components for valid point-to-point fares for MIA to LAX, and LAX to MIA, respectively. For example, list G1 comprises three fare amount/fare class pairs F1, F2, and F3, and list G2 comprises three fare amount-fare class pairs F9, F10 and F11. In this embodiment, and as discussed previously in conjunction with FIGS. 4-6, F1=150, F2=225, F3=350, and F9=75, F10=125, and F11=150. Similarly, lists G3 and G4 comprise the two fare components F4-F8 and F12-F15 for round trip fares, for MIA to IAH and IAH to MIA, respectively. Lists G5-G8 for passenger PB similarly comprise valid fares for round trip and point-to point travel. In some cases, lists G1-G4 and G5-G8 may comprise identical fares, if there are no fare differences for passengers PA and PB.

Iterator I1 identifies the next lowest valid combination for fare components in lists G1 and G2, resulting in a first lowest valid pricing solution PSI for passenger PA. Similarly, iterator I2 identifies the next lowest valid fare combination for point to point travel for passenger PA resulting in a second lowest pricing solution PS2. Pricing solutions PS3 and PS4 for passenger PB are similarly determined using iterators I3 and I4. Iterators I1-I4 validate the combinability of the fare components in lists G1-G8 using any suitable method to determine pricing solutions PS1-PS4, including the one described in conjunction with FIG. 6.

Although FIG. 8 illustrates two lists or generators for each pricing solution, the itinerary may include additional stopovers, routings, connection changes or the like. In such a case, each pricing solution would comprise a plurality of lists, one list for each fare component. For example, iterator I1 would utilize as inputs lists G1-Gn for an n-fare component pricing solution. Further, FIG. 8 may comprise an additional plurality of iterators I1, . . . ,Im to process a plurality of types of pricing solutions PSn, as needed. For example, if the itinerary comprises another method of construction in addition to the round trip and point-to-point pricing solutions, such as an open jaw priceable unit, an additional iterator would process the additional pricing solution PSn.

Selectors S1 and S2 determine a lowest pricing solution for each passenger PA and PB. In one embodiment, selectors S1 and S2 may choose a next-lowest price between pricing solutions PS1 and PS2, and PS3 and PS4, respectively. Selector S1 may also utilize other algorithms to determine the next-lowest price. For example, where pricing solutions PS1 and PS2 comprise only a portion of an itinerary, selector S1 may sum pricing solutions PS1 and PS2 to determine a price for the total itinerary. For a one-passenger itinerary, the output of selector S1 comprises the itinerary price. Selectors S1 and S2 may comprise the same structure and method where the passengers travel using the same itinerary.

To determine the lowest valid pricing solution for the two-passenger itinerary, iterator I5 then minimizes the sum of the lowest valid combinations for passengers PA and PB. Iterator I5 may need to determine whether pricing solutions PSI and/or PS2 may be validly combined with pricing solutions PS3 and/or PS4. For example, in some instances, a pricing solution for one passenger may be subject to criteria, such as rules or restrictions, which may prevent combinability with a pricing solution for the other passenger. For example, two children may not be able to travel together without adult supervision. Iterator I5 then may not validly combine two child passengers PA and PB without an adult present. Iterator I5 may utilize any suitable method, including the one described in conjunction with FIG. 6. Iterator I5 may also comprise an identical method to iterators I1, I2, I3, and/or I4.

As discussed in conjunction with FIG. 6, iterator I5 may comprise a topmost cascaded level process. For example, if iterator I5 were to determine that pricing solutions PSI and/or PS2 may not be validly combined with pricing solutions PS3 and/or PS4. In such a case, the method may return to iterators I1, I2, I3, and/or I4 to process a next-lowest valid combination for selectors S1 and S2. Selectors S1 and S2 produce new pricing solutions PSI and/or PS2, and PS3 and/or PS4. Iterator I5 then determines whether these new pricing solutions may or may not be validly combined. The method continues until a valid price for the itinerary is found, or determines that no valid price for the itinerary is available.

Although FIG. 8 illustrates one level of iterators I1-I4, each comprising two inputs, iterators I1-I4 may comprise a plurality of inputs. Iterators I1-I4 may also comprise cascaded iterators. For example, in a three-fare component pricing solution, iterator I1 may comprise iterator I1A whose inputs comprise lists G1 and G2, and iterator I1B whose inputs comprise list G3A and the output of iterator I1A. Iterator I5 may also be similarly structured or cascaded, for a plurality of passengers. Similarly, selectors S1 and S2 may comprise a plurality of inputs. It is also within the scope of the invention for the method as illustrated in FIG. 8 to comprise any number of levels.

Furthermore, other criteria may introduce additional processing, or variations in processing, which may be incorporated into the method as illustrated in FIG. 8 in many ways. For example, in this embodiment of the invention, additional surcharges may be added to a fare. In such a case, the method in FIG. 8 should accommodate the surcharges in its assessment of a proper pricing solution for each passenger, as well as the entire itinerary. Such surcharges may be introduced at various points in processing in FIG. 8. For example, surcharges may be added to each applicable fare in a generator, an iterator, or a selector.

Information management system 10 may utilize any suitable hardware, firmware or software for implementing these processes and the method as graphically illustrated in FIG. 8. In one embodiment, for example, a generator may comprise a Prolog structure. In another embodiment of the invention, each process may comprise an object. For example, each generator G1 through G8 may be instantiated as needed. Each generator instance may comprise input parameters, such as a list of fares. Each fare may be an object reference to an instance of a fare class. Methods used by each generator object or instance may comprise a method of the fare invoked by the generator or instance. Thus, as each generator encounters an identical fare, the generator may avoid revalidation of that same fare already validated by a prior generator.

Shared data structures, e.g., the same fare information applicable to the same itinerary, may also be used for passengers PA and PB, or where such data structures are applicable. Shared data structures may also be used to include data such as fare component rules, which may be solely based on fare and itinerary, so that neither the pricing solution nor the passenger requirements alter computed results. Use of such data structures may desirably reduce physical memory requirements and processing time, where valid fare lists such as G1 and G5 may comprise identical or similar list components.

Similarly, as discussed in conjunction with FIGS. 6-7, information management system 10 may also utilize the method above to maximize a total sum. For example, iterators I1-I5 may select valid combinations that maximize the sum of the combination. Such a method may also be advantageous over various applications and industries, which may include, without limitation, maximizing total sums of discounts, profits, investment returns, or the life of parts that may be used in a manufacturing assembly.

The iterators, generators and selectors comprise building blocks that may be used to generate solutions that maximize or minimize total combinations. For example, these building blocks may be employed in a variety of configurations to generate fares, and to satisfy one or more itineraries. These building blocks may comprise identical or different methods, and may be employed in a variety of combinations at one or more levels. Information management system 10 can thus utilize these building blocks to incorporate new types of or additional fare calculations to any existing calculations therein.

While the invention has been particularly shown and described by the foregoing detailed description, it will be understood by those skilled in the art that various other changes in form and detail may be made without departing from the spirit and scope of the invention.

What is claimed is:

1. A travel pricing system, comprising:
a data store; and
a server coupled to the data store, the server:
receiving from a service provider a first reservation record relating to a first type of record, the first reservation record comprising travel attributes and a first version number, the travel attributes arranged in a first record format;
associating the first reservation record with a first time stamp;
adding the first reservation record and time stamp to the data store using the first reservation record format;
receiving from the service provider a second reservation record relating to the first type of record, the second reservation record comprising at least a portion of the travel attributes associated with the first reservation record and a second version number different from the first version number, the travel attributes arranged in a second record format different from the first record format;
associating the second reservation record with a second time stamp; and
adding the second reservation record and time stamp to the data store using the second reservation record format.

2. The system of claim 1, wherein the first reservation record and the second reservation record are added to the data store by appendage into a flat file.

3. The system of claim 1, wherein the second reservation record comprises travel reservation data associated with a city pair.

4. The system of claim 1, wherein the second reservation record is added to the data store by using the time stamp as a key into a database.

5. The system of claim 1, the server further:
receiving a third reservation record relating to a second type of record, the third reservation record comprising travel attributes and the first version number, the travel attributes arranged in a third record format;
associating the third reservation record with a third time stamp; and
adding the third reservation record and time stamp to the data store using the third reservation record format.

6. A travel pricing system, comprising:
a data store; and
a server coupled to the data store, the server:
receiving from a service provider a first reservation record relating to a first type of record, the first reservation record comprising travel attributes and a first version number, the travel attributes comprising old fare data associated with a city pair and arranged in a first record format;
associating the first reservation record with a first time stamp;
adding the first reservation record and time stamp to the data store using the first reservation record format;
receiving from the service provider a second reservation record relating to the first type of record, the second reservation record comprising at least a portion of the travel attributes associated with the first reservation record and a second version number different from the first version number, the travel attributes of the second reservation record comprising new fare data associated with the city pair and arranged in a second record format different from the first record format;
associating the second reservation record with a second time stamp; and
adding the second reservation record and time stamp to the data store using the second reservation record format, wherein the first reservation record and the second reservation record are added to the data store by appendage into a flat file chronologically using the time stamp.

7. The travel pricing system of claim 6, wherein the fare data comprises a fare associated with the service provider.

8. The travel pricing system of claim 7, wherein the data store comprises files indexed by city pair.

9. The system of claim 8, the server further:
receiving a first rule data relating to the city pair;
adding the first rule data to the data store;
receiving a second rule data relating to the city pair; and
adding the second rule data to the data store without modifying the first rule data.

10. The travel pricing system of claim 6, wherein the data store comprises data files indexed by city pair and by carrier.

11. The travel pricing system of claim 6, wherein the time stamp comprises an activation stamp that indicates when the server can initially use the second reservation record.

12. The system of claim 6, the server further:
receiving a third reservation record relating to a second type of record, the third reservation record comprising travel attributes and the first version number, the travel attributes comprising old fare data associated with a second city pair and arranged in a third record format;
associating the third reservation record with a third time stamp; and
adding the third reservation record and time stamp to the data store using the third reservation record format.

13. A method for organizing travel reservation data, comprising:
receiving from a service provider a first reservation record relating to a first type of record, the first reservation record comprising travel attributes and a first version number, the travel attributes arranged in a first record format;
associating the first reservation record with a first time stamp;
adding the first reservation record and time stamp to a data store using the first reservation record format;
receiving from the service provider a second reservation record relating to the first type of record, the second reservation record comprising at least a portion of the travel attributes associated with the first reservation record and a second version number different from the first version number, the travel attributes arranged in a second record format different from the first record format;
associating the second reservation record with a second time stamp; and
adding the second reservation record and time stamp to the data store using the second reservation record format.

14. The method of claim 13, wherein the first reservation record and the second reservation record each comprise travel reservation data associated with a city pair.

15. The method of claim 13, wherein the second reservation record is added to the data store by using the time stamp as a key into a database.

16. The method of claim 13, further comprising dynamically processing the format of the first reservation record that differs from the format of the second reservation record utilizing Prolog.

17. The method of claim 13, wherein the first reservation record and the second reservation record are added into the data store by appendage into a flat file chronologically using the time stamp.

18. The method of claim 13, further comprising synchronizing the second reservation record with an additional server.

19. The method of claim 13, wherein the data store comprises files indexed by city pair.

20. The method of claim 13, wherein the attributes comprise one selected from the group consisting of fares associated with the service provider, rules associated with the service provider, and restrictions associated with the service provider.

21. The method of claim 13 further comprising:

receiving a third reservation record relating to a second type of record, the third reservation record comprising travel attributes and the first version number, the travel attributes arranged in a third record format;

associating the third reservation record with a third time stamp; and adding the third reservation record and time stamp to the data store using the third reservation record format.

\* \* \* \* \*